United States Patent

McMullen

[15] 3,661,713
[45] May 9, 1972

[54] PROCESS FOR PRODUCING ZEARALENONE

[72] Inventor: James R. McMullen, Terre Haute, Ind.
[73] Assignee: Commercial Solvents Corporation
[22] Filed: June 18, 1970
[21] Appl. No.: 47,638

[52] U.S. Cl. .............................................. 195/36 R, 195/81
[51] Int. Cl. ....................................................... C12d 13/00
[58] Field of Search............................. 195/36 R, 81; 424/279

[56] References Cited

UNITED STATES PATENTS 3,196,019  7/1965  Andrews et al. ...................... 195/36 R Primary Examiner—Alvin E. Tanenholtz
Attorney—Behringer, Bernard, Brown, Dresser, Morton, Jr., Roberts, Southerland

[57] ABSTRACT

The production of zearalenone in a submerged fermentation process employing submergible, zearalenone-producing strains of *Gibberella zeae* is enhanced by inclusion of cationic zinc in the fermentation medium.

14 Claims, No Drawings

PROCESS FOR PRODUCING ZEARALENONE

This invention relates to the production of zearalenone by the cultivation of submergible, aerobic zearalenone-producing strains of *Gibberella zeae* in a fermentation medium containing yield-enhancing amounts of cationic zinc in the fermentation medium.

It has been discovered by Chester L. Keith, as disclosed in application, Ser. No. 47,637 filed June 18, 1970, that submergible, aerobic zearalenone-producing strains of the microorganism *Gibberella zeae* will efficiently produce zearalenone when cultivated by submersion in an agitated, aerated, aqueous, liquid phase fermentation medium containing assimilable carbon, nitrogen and mineral sources. The structural formula for zearalenone is as follows:

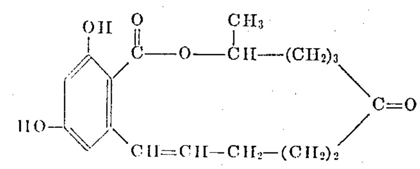

Prior to his discovery, attempts to produce zearalenone by submerged culture fermentation were decidedly unsuccessful. An advantage of employing the submerged culture technique, as compared, say, to static fermentation on a porous substrate, is that a simple, and therefore less expensive, process and recovery operation can be utilized to collect the zearalenone product. It is disclosed therein that it is preferable to include an amount of yeast extract in the medium to enhance the production of zearalenone, as well as the necessary sources of assimilable carbon, nitrogen and minerals.

It has now been found that the yeast extract can be replaced with cationic zinc, for instance by using an extraneous source of water soluble zinc compound, and still achieve enhanced zearalenone production. If, in accordance with a preferred embodiment of the present invention, a yield-enhancing amount of an enzymatic hydrolyzate of protein is included in the medium together with the zinc compound, then essentially all of the yield enhancement which the yeast extract would provide can be attained. One of the values of the present discovery is that, whereas water soluble zinc compounds such as zinc sulfate are relatively inexpensive, the equivalent amount (in terms of zinc content) of yeast extract can cost several thousand times as much. For example, the cost of the amount of zinc sulfate preferred for 15,000 gallons of fermentation medium would be approximately 8 to 10 cents, compared to about $1,050 for the preferred amount of yeast extract therefor.

As examples of suitable extraneous sources of cationic zinc may be mentioned inorganic and organic water soluble compounds such as zinc sulfate, zinc chloride, zinc nitrate, and zinc acetate. The total amount of cationic zinc employed in the fermentation medium is minor, generally ranging from about 0.09 to about 0.23, preferably from about 0.14 to 0.18, micrograms (calculated as cationic zinc) per milliliter of medium. When using zinc sulfate, for example, the optimum concentration has been found to be about 0.4 to 0.8 micrograms of $ZnSO_4{\cdot}7H_2O$ per milliliter of medium.

Submergible, aerobic zearalenone-producing strains of *Gibberella zeae* types of cultures are on unrestricted deposit at the American Type Culture Collection (ATCC). They will efficiently produce zearalenone when cultivated by submersion in an agitated, aerated, aqueous, liquid phase fermentation medium containing nutrients including assimilable carbon, nitrogen and mineral sources. These strains include *Gibberella zeae* (Schw.) Petch strain 542 Keith ATCC 20273 and *Gibberella zeae* (Schw.) Petch strain Paul S. ATCC 20271. Preferably, distilled water, deionized water, or tap water which has been heated to boiling and then filtered is used in the medium. Aeration of the medium is preferably effected by bubbling air therethrough, preferably sterile air, and preferably at a rate of about 0.25 to 2 volumes of air, calculated at about atmospheric pressure, per volume of medium, per minute. The temperature of the medium is preferably maintained at about 20 to 28, most preferably about 21° to 24° C. During the early stages of the fermentation, for example until zearalenone production has started, it is preferred not to allow the temperature to get much above 24° C. The medium is advantageously agitated to disperse and make air available to the microorganism and this can be effected by any suitable means, e.g., by a stirrer operating at about 200 to 500 r.p.m. in a 20 liter fermentor.

The assimilable carbon source in the fermentation medium is advantageously glucose, e.g., reagent grade glucose. Cerelose, a white, crystallized, refined glucose, is a suitable for the process. Also suitable, but less preferred, carbon sources are other carbohydrates which will not deleteriously affect the production of zearalenone, such as xylose, fructose, sucrose, and galactose. Xylose performs better when used in admixture with glucose (for example, at a ratio of 7.5 parts by weight of xylose to 22.5 parts by weight of glucose) than when used as the sole carbon source. If desired, a portion of the glucose, when employed, say up to about 50 weight percent thereof, can be substituted with glycerol. As an alternative to supplying actual glucose to the fermentation medium, a precursor thereof, such as starch, which, under the conditions of the process, will be converted to glucose, can also be used. The amount of assimilable carbon source used in the fermentation medium is that which is sufficient for reduction by the microorganism to produce zearalenone and, for example in the case of glucose, will generally range from about 20 to about 40, preferably about 25 to 35, grams of glucose per 100 cc. of the medium.

The assimilable nitrogen source for the fermentation medium can be either inorganic or organic, but preferably it is the latter. Ammonia-supplying, neutral compounds that are easily hydrolyzable are generally suitable. Examples of suitable nitrogen-supplying compounds are urea, asparagine, ammonium salts such as ammonium nitrate and ammonium fumarate, glutamine, glycine, ammonium hydroxide, and Sheffield's NZ Amine Type HD, a protein hydrolyzate. The preferred nitrogen source is urea, and this is generally employed in an amount in the range of about 0.2 to 0.8, preferably about 0.3 to 0.7, grams per 100 cc. of the fermentation medium.

The mineral sources included in the fermentation medium as nutrients include the elements, iron, phosphorus, potassium, sulfur, and magnesium, preferably in water soluble form. The amounts of the various can vary considerably although each should be present in an amount sufficient to insure proper growth of the microorganism. Generally effective amounts of each of these elements, calculated as the free element, range from about 0.001 to 1 gram per 100 cc. of the medium. Preferred sources of these elements include dipotassium phosphate (i.e., $K_2HPO_4$), magnesium sulfate (e.g., supplied as $MgSO_4{\cdot}7H_2O$), potassium chloride, and, as a source of iron, sulfur and phosphorus, the aforementioned NZ Amine Type A. The potassium chloride can also function in the medium as an osmotic pressure-enhancing salt, as is hereinafter discussed. The preferred amount of dipotassium phosphate employed is about 0.05 to 0.3 grams per 100 cc. of medium, and the preferred amount of magnesium sulfate (calculated as $MgSO_4{\cdot}7H_2O$) is about 0.025 to 0.2 grams per 100 cc. of medium. Iron is an especially desired ingredient of the medium when the carbon source is reagent grade glucose.

There is preferably included in the fermentation medium used in the process yield-enhancing amounts of a protein hydrolyzate, e.g., an enzymatic hydrolyzate of protein, most preferably an enzymatic hydrolyzate of casein, such as Sheffield's NZ Amine Type A and Amber's ECH. The Sheffield N-Z-Amine Type A is a pancreatic hydrolysate of casein which contains, in the form of mixed amino acids and peptides, all amino acids originally present in casein. The hydrolyzate is preferably present in the medium in an amount of at least about 0.1 grams, say about 0.1 to 2 grams, per 100 cc. of the medium. The most preferred hydrolyzate is NZ Amine Type A. Less preferred, but operable, substitutes for the hydrolyzate are vitamin-free casein and casein itself. The use of an enzymatic hydrolyzate, for example NZ Amine Type A, has been indicated to be particularly useful where the carbon source employed is reagent grade dextrose.

Growth promoting amounts of animal amino acids, e.g., about 0.1 to 0.3 grams per 100 cc. of the medium, of beef extract such as Difco's beef extract, can also be included in the medium.

A foam inhibitor, preferably one which will not deleteriously affect the production of zearalenone, is advantageously included in the fermentation medium. Those which have been indicated to be the least deleterious, so far as zearalenone yields are concerned, are the silicone foam inhibitors, e.g., Antifoam 10 (a non-ionic silicone emulsion containing about 10 percent silicon solids, a General Electric Co. product). Others which are effective, but which reduce zearalenone yields somewhat, include corn oil, lard oil, mineral oil, and fatty alcohols such as lauryl alcohol.

An osmotic pressure-enhancing salt can also be included in the fermentation medium. Examples of such are the alkali metal salts, e.g., sodium acetate, sodium citrate, sodium succinate, sodium chloride, and potassium chloride. Most preferred are the alkali metal halides, e.g., sodium chloride and potassium chloride, and these are preferably present in an amount in the range of about 1 to 4 grams per 100 cc. of the medium.

Zearalenone yields and carbon source utilization appear to be improved when the medium is sterilized by autoclaving, for example about 10 to 30 minutes for a volume up to 3 liters at about 10 to 20 p.s.i.g. of steam, prior to being inoculated.

The fermentation is advantageously allowed to proceed until substantially all of the assimilable carbon is used, generally for about 5 to 23 days, before the medium is subjected to a recovery treatment to recover the zearalenone therefrom. The zearalenone recovery can be effected by any suitable procedure, for example by filtering the medium, slurrying the filter cake with an aqueous alkaline solution so as to dissolve the zearalenone, filtering the slurry, acidifying the filtrate so as to precipitate out the zearalenone, and then recovering the precipitated zearalenone, which method is described in U.S. Pat. application Ser. No. 721,604 of Hidy and Young, filed Apr. 16, 1968, and herein incorporated by reference.

The initial pH of the fermentation medium will generally be about 6.1 to 7.2, preferably about 6.2 to 7.0. As the fermentation proceeds, the pH declines. It will usually decline to a low of, say, about 3.4 to 4.0, often about 3.6 to 3.7, within about 2 to 4 days and will continue at these pH levels for the remainder of the fermentation. If nothing is then added to the medium to adjust the pH, it will remain at that level for the duration of the fermentation period. Fortunately, relatively few contaminating organisms can multiply at pH values below about 4.

The following examples are offered to illustrate the present invention.

EXAMPLE I

Several series of experiments were run with zinc sulfate being added to the fermentation medium described below in amounts ranging from 0.05 to 0.23 micrograms (calculated as cationic zinc) per milliliter of medium.

The inocula for the experiments were prepared from the inoculum medium described below. In each instance 100 ml. of the inoculum medium was placed in a 500 ml. Erlenmeyer flask, and the flask then closed with cotton plugs and autoclaved for 15 minutes at 15 psig steam.

The first stage of a two-stage inoculum was inoculated with 5 ml. of a mycelial suspension or 5 ml. of a spore suspension of ATCC 20273. After 24 hours incubation at 30° C. on a rotary shaker, 5 milliliters of the first stage inoculum was transferred to a second flask of the same medium. The second state, also grown at 30° C. on a rotary shaker, was ready to use after 20–22 hours.

The fermentation medium, 100 ml. in 500 ml. Erlenmeyer flasks closed with two milk filter disks, was autoclaved at 15 pounds pressure for 10 minutes. Five milliliters of the second stage inoculum was used. After 12-14 days the contents of the flasks were assayed by ultra-violet spectrophotometry using the 236 m$\mu$ reading for calculations.

INOCULUM MEDIUM

| | |
|---|---|
| NZ Amine Type A | 0.2 grams per 100 cc. medium |
| Beef Extract | 0.1 grams per 100 cc. medium |
| Yeast Extract | 0.1 grams per 100 cc. medium |
| NaCl | 0.25 grams per 100 cc. medium |
| Cerelose | 1.0 grams per 100 cc. medium |
| Distilled Water | balance |

FERMENTATION MEDIUM

| | |
|---|---|
| Cerelose | 33.0 grams per 100 cc. medium |
| KCl | 0.025 grams per 100 cc. medium |
| K$_2$HPO$_4$ | 0.05 grams per 100 cc. medium |
| MgSO$_4$·H$_2$O | 0.025 grams per 100 cc. medium |
| Urea | 0.41 grams per 100 cc. medium |
| Yeast extract or zinc sulfate | as indicated |
| Distilled Water | balance |

The data obtained from the experiments are presented in two methods in Tables Ia and Ib. In Table Ia each assay is expressed as a percent of the assay obtained for an experiment in that series which used 0.1 gram of yeast extract per 100 cc. of medium rather than zinc sulfate in the medium. In Table Ib each assay is reported as a percent of the highest assay obtained in that particular series of experiments.

TABLE Ia.—Summary of Zearalenone Assays Expressed as Percent of Yeast Extract Control [1]

| Zinc [2] | Experiment series | | | | | | |
|---|---|---|---|---|---|---|---|
| | 563285 | 563287 | 563297 | 563300 | 568203 | 568206 | 568210 |
| .05 | 15.3 | | | | | | |
| .07 | 30.8 | | | | | | |
| .09 | 56.5 | | | | | | |
| .11 | 86.0 | | | 87.5 | | | |
| .14 | 101.8 | 102.9 | 95.7 | 98.4 | 85.4 | 78.7 | 100.7 |
| .16 | 109.7 | 95.8 | | 96.7 | | | |
| .18 | 126.3 | 71.5 | 20.8 | 87.4 | 75.0 | | |
| .21 | 115.6 | 35.7 | | | | | |
| .23 | 114.6 | 27.8 | | | | | |

[1] Yeast extract control of 0.1 gram per 100 cc. medium = 100.
[2] Calculated as micrograms of cationic zinc per milliliter of medium.

TABLE Ib.—Summary of Zearalenone Assays Expressed as Percent of Highest Titer in Experiment [1]

| Zinc | Experiment series | | | | | |
|---|---|---|---|---|---|---|
| | 563285 | 563287 | 563297 | 563300 | 568203 | 568233 |
| .05 | 12.1 | | | | | 5.6 |
| .07 | 24.4 | | | | | |
| .09 | 44.6 | | | | | 39.4 |
| .11 | 68.1 | | | 88.9 | | |
| .14 | 80.6 | 100 | 100 | 100 | 100 | 75.3 |
| .16 | 86.9 | 93.1 | | 98.2 | | |
| .18 | 100 | 69.5 | 21.8 | 88.8 | 87.8 | 100 |
| .21 | 91.5 | 34.7 | | | | |
| .23 | 90.7 | 27.0 | | | | 79.6 |

[1] Highest titer in experiment = 100.

EXAMPLE II

In five experiments with 0.3 gram of NZ Amine A per 100 cc. of medium is added to a fermentation medium containing 0.14 micrograms of cationic zinc per milliliter of medium as in Example I. The zearalenone titers averaged 34 percent higher than those containing cationic zinc without NZ Amine A.

EXAMPLES III to V

Essentially the same procedure and conditions employed in Example II are followed except zinc chloride, zinc nitrate and zinc acetate are used instead of zinc sulfate.

EXAMPLE VI

Essentially the same procedure and conditions employed in Example II are followed except *Gibberella zeae* (Schw.) Petch strain Paul S. ATCC 20271 is used instead of ATCC 20273.

It is claimed:

1. In a process for the production of zearalenone by cultivation, in the absence of substantial amounts of zinc-containing yeast extract, of submergible, aerobic zearalenone-producing strains of the microorganism *Gibberella zeae* while submerged in an agitated, aerated, aqueous, liquid phase fermentation medium containing assimilable carbon, nitrogen and mineral sources, the improvement of including in the medium, from about 0.09 to 0.23 micrograms of cationic zinc per milliliter of the medium.

2. The improvement of claim 1 wherein the microorganism is *Gibberella zeae* (Schw.) Petch strain 542 Keith ATCC 20273 or *Gibberella zeae* (Schw.) Petch strain Paul S. ATCC 20271.

3. The improvement of claim 2 wherein zinc (calculated as free metal) is present in the medium in a total amount of about 0.14 to 0.18 micrograms per milliliter of medium.

4. The improvement of claim 2 wherein the carbon source is glucose.

5. The improvement of claim 4 wherein the glucose comprises about 20 to 40 grams per 100 cc. of the fermentation medium.

6. The improvement of claim 4 wherein the nitrogen source is urea.

7. The improvement of claim 5 wherein the nitrogen source is urea and comprises about 0.2 to 0.8 grams per 100 cc. of the fermentation medium.

8. The improvement of claim 7 wherein the medium is maintained at a temperature of about 20° to 28° C.

9. The improvement of claim 8 wherein the fermentation medium additionally contains yield-enhancing amounts of a hydrolyzate of protein.

10. The improvement of claim 9 wherein the hydrolyzate is an enzymatic hydrolyzate of casein and is present in the medium in an amount of at least about 0.3 grams per 100 cc. of the medium.

11. The improvement of claim 6 wherein the cationic zinc is provided by a compound selected from the group consisting of zinc sulfate, zinc chloride, zinc nitrate and zinc acetate.

12. The improvement of claim 11 wherein the mineral source includes phosphorus, potassium, sulfur, iron and magnesium.

13. The improvement of claim 11 wherein the water in the medium is selected from the group consisting of deionized water, distilled water, and tap water which has been heated to boiling and then filtered.

14. The improvement of claim 11 wherein air is conducted into the medium at a rate of about 0.25 to 2 volumes, calculated at about atmospheric pressure, per volume of medium per minute.

* * * * *